Feb. 8, 1966  M. E. ULLMAN, JR., ETAL  3,233,919
SUMP SEAL FOR A DISHWASHER

Filed Dec. 10, 1963  2 Sheets-Sheet 1

INVENTORS.
MYRON E. ULLMAN, JR.
& JERRY M. HARROFF
BY
Tillberry & Body
ATTORNEYS INVENTORS.
MYRON E. ULLMAN, JR. &
JERRY M. HARROFF
BY
*Tillberry & Body*
ATTORNEYS United States Patent Office 3,233,919
Patented Feb. 8, 1966

1

3,233,919
SUMP SEAL FOR A DISHWASHER
Myron E. Ullman, Jr., Canfield, and Jerry M. Harroff, Salem, Columbiana, Ohio, assignors to Mullins Manufacturing Corporation, Salem, Ohio, a corporation of Ohio
Filed Dec. 10, 1963, Ser. No. 329,579
3 Claims. (Cl. 285—13)

This invention relates to sealing devices and more particularly to a sump seal for a dishwashing machine.

Since dishwashing machines of the type contemplated in this application for illustrative purposes are used in the kitchen area of homes and, further since a considerable volume of water is moved about within and subsequently withdrawn from the machine in the course of its operation, it is essential that the sealing means, especially between the sump and the underside of the machine be fluid tight. Accordingly it is a principal object of this invention to provide a novel and unique sealing structure which will prevent leakage between the bottom of the dishwashing machine and the sump or drain assembly mounted therein.

In addition to providing positive protection against leakage it is also important, from an economic standpoint, that the sealing arrangement be of simple construction and capable of being quickly and easily installed and removed for both assembling and replacement purposes. It is therefore a further important object of the present invention, to provide a seal which possesses the above referred to advantages and desirable features.

In the art of providing a water tight seal between two surfaces or edges, a common approach is to cement or bolt a relatively resilient material between the two surfaces or edges. Although this approach is satisfactory for certain applications, it is generally unacceptable where the immediate adjacent surfaces must present a clean and smooth appearance, and/or where speed of assembly and ease of replacement is essential, such as in dishwashing machines, and/or where one or both of the surfaces are coated with a plastic water proof material which cannot be subjected to the scraping which is usually required when replacing a worn out seal which has been cemented or bolted in position. Accordingly, it is a still further object of this invention to provide a positive and clean seal structure which does not require the use of cement or bolts to effect the desired seal between two surfaces or edges thereof.

Another object of the present invention is to provide an effective seal which also prevents the transmission of vibration from the motor and pump assembly to the dish chamber in the cabinet of the dishwashing machine.

Briefly, these and other objects are attained in a dishwashing machine in which an outlet is provided in the bottom wall thereof with a sump mounted therein for draining the dish chamber. The seal of the present invention, which is particularly useful for effecting a fluid tight seal between the outlet in the bottom wall and the flanged end of a sump conduit, is in the form of an open ended tubular body having an outwardly projecting rim at one end with a recess formed therein and a grooved inner wall portion intermediate the opposite ends. The fluid tight seal is effected by mounting the flanged sump within the seal in such a manner that the flange of the sump is received within the recess in the rim. The sealed

2 arrangement is made still more positive by folding the unflanged portion of the tubular body which extends beyond the intermediate grooved portion, outwardly and upwardly against the outer surface of the outlet in the bottom wall of the tank. In order to securely position the folded seal, a strap may be tightened around the outer surface of the folded tubular seal.

Further objects and advantages of the present invention will be apparent from the following description, reference being had to the accompanying drawings wherein a preferred form of the invention is clearly shown.

Figure 1:
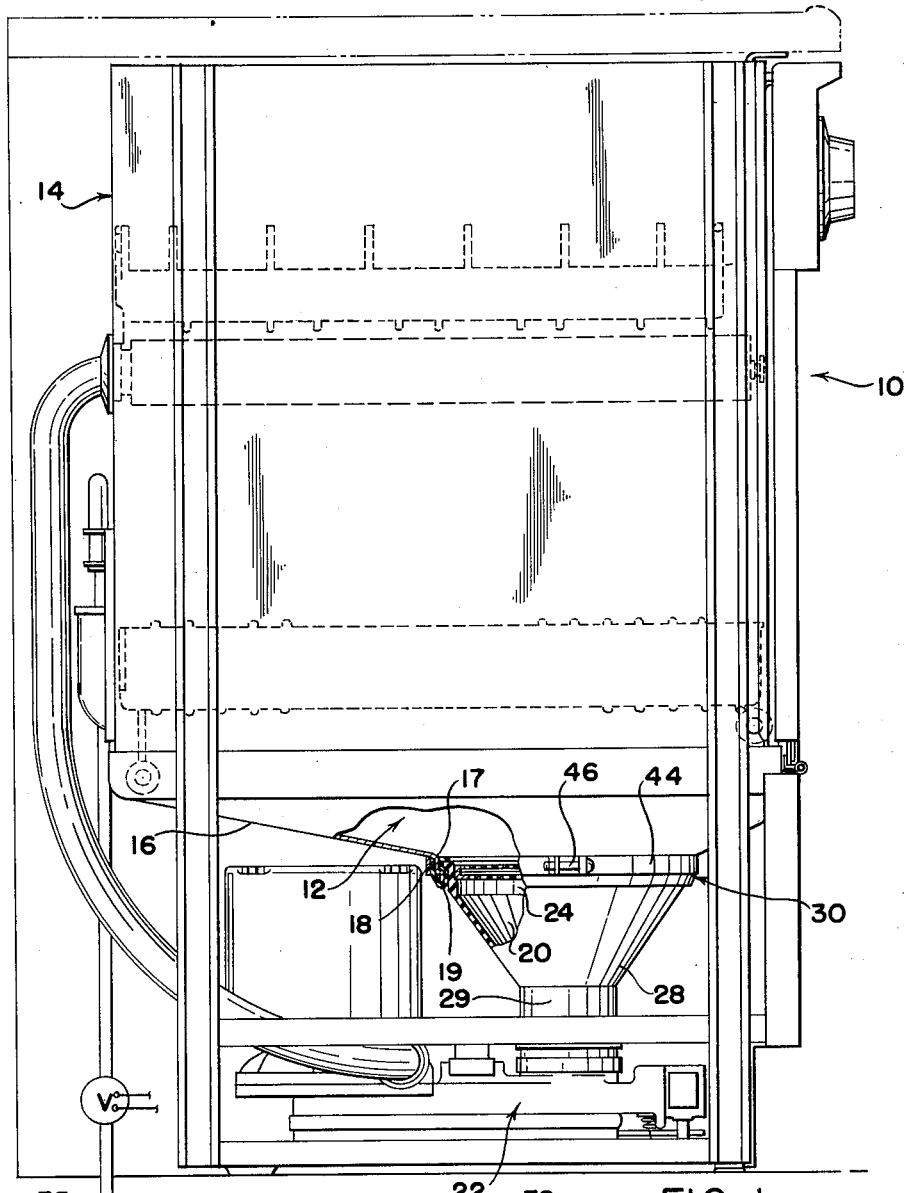
FIG. 1 is a side elevational view of an automatic dishwasher with parts broken away to illustrate the location and structural arrangement of one form of the seal embodying the invention.

While the various features of this invention are hereinafter illustrated and described as being particularly adaptable for effecting a sealed condition between the sump and bottom wall of a dishwasher or the like, it is to be understood that the various features of this invention can be utilized singly or in any combination thereof to provide a sealing means for other devices as desired.

Therefore, this invention is not to be limited to the only embodiment illustrated in the drawings, because the drawings are merely utilized to illustrate one of the wide variety of uses for this invention.

Referring now to the drawings and more particularly to FIG. 1, an automatic dishwasher is shown and generally designated by the numeral 10 and includes a dish chamber 12 which is enclosed by a cabinet 14. The cabinet 14 includes a bottom wall 16 which slopes downwardly to a generally central circular opening or outlet 17 defined by an annular side wall 18 and an annular flange 19 projecting inwardly therefrom. This flange opening or outlet 17 functions as the drain opening in the dishwashing machine into which water flows from chamber 12 through a funnel-shaped sump 20 and into a water distributing means generally indicated by the numeral 22.

As shown in FIG. 1, a hollow elongated sump 20 is defined by a cylindrical wall 24 in which an inwardly projecting shoulder 25 is formed to receive a filtering screen designated by the number 26. At one end of wall 24 there is provided an outwardly projecting annular flange 27 of greater exterior diameter than the diameter of opening 17, while at the other end a conical shaped wall 28 is formed which slopes downwardly and inwardly into an annular side wall 29 which is the outlet end of the sump.

The present invention provides a seal body, generally indicated by the numeral 30, for effecting a fluid tight engagement between sump 20 and the outlet 17 formed in bottom wall 16 of the dishwasher.

Figure 2:
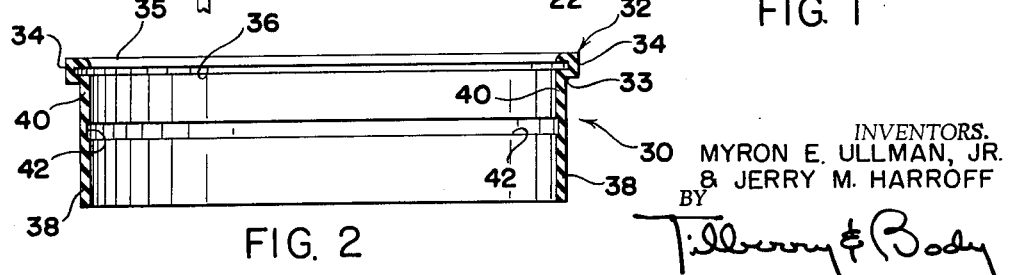
FIG. 2 is a cross-sectional view of the seal in its unfolded condition.
Figure 3:
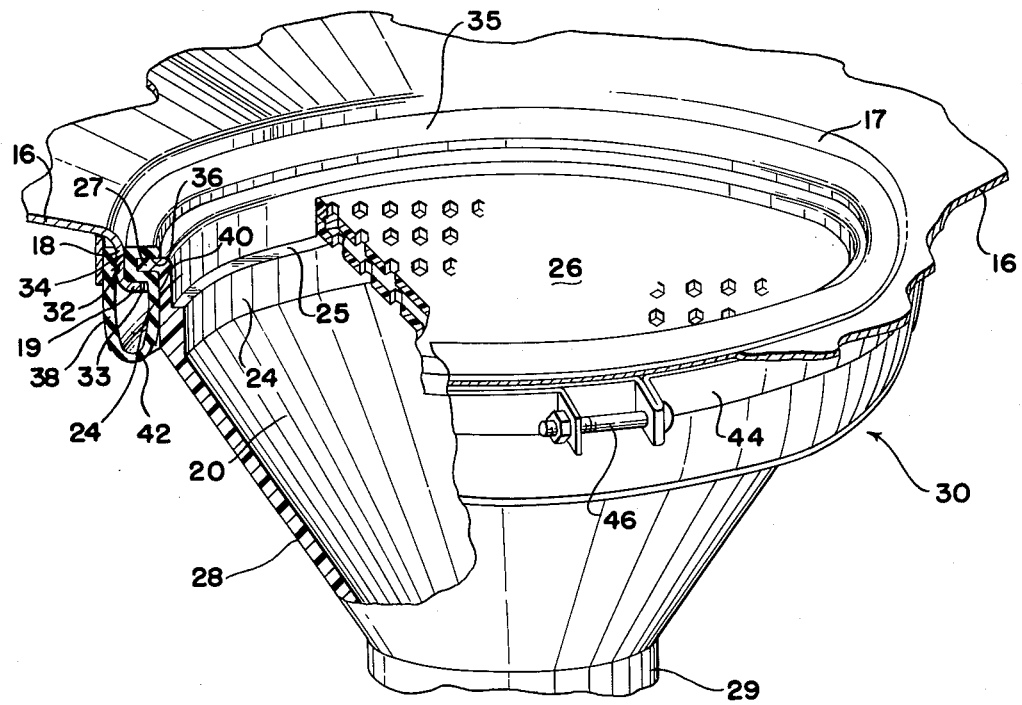
FIG. 3 is a perspective view, with parts broken away and sectioned, showing the seal in its mounted, folded and secured position between the sump and bottom wall of the dishwashing machine.

With more particular reference now to FIG. 2, seal 30 has the general form of a hollow cylinder which is open at both ends and is preferably made of a flexible, resilient water proof material such as natural or synthetic rubber. At one of its ends seal 30 is provided with an integrally formed hollow rim 32 which encircles and projects outwardly from the body of the seal. Rim 32 which has a shoulder 33, a side wall 34 and an inwardly projecting flange 35, is provided with a recess 36 which is formed around the inner periphery of the rim and is greater in depth than the thickness of the body wall of the seal.

In order to enable the unrimmed end 38 of seal 30 to be folded over the rimmed end 40, for purposes presently described, a relatively wide groove 42 is provided in and around the inner surface of the cylindrical wall of the seal intermediate ends 38 and 40. As a result of groove 42, the body of the seal may be folded over onto itself and remain in this folded condition without further support and without undue stress and strain to the wall in the area of the groove.

In order to effect a fluid tight engagement between sump 20 and outlet 17 by means of the present invention, seal 30 is mounted onto sump 20 in such a manner that flange 27 is received within recess 36 of rim 32 and the outlet end 29 of the sump extends through and beyond the unrimmed end 38 of the seal. The dimensional relationship between sump 20 and seal 30 is such that the full extension of sump flange 27 from sump wall 24 should be received within recess 36 so as to achieve a snug fitting contact between flange 27 and shoulder 33, wall 34 and flange 35 of rim 32, and also between sump wall 24 and the inner surface of rimmed end portion 40.

Figure 4:
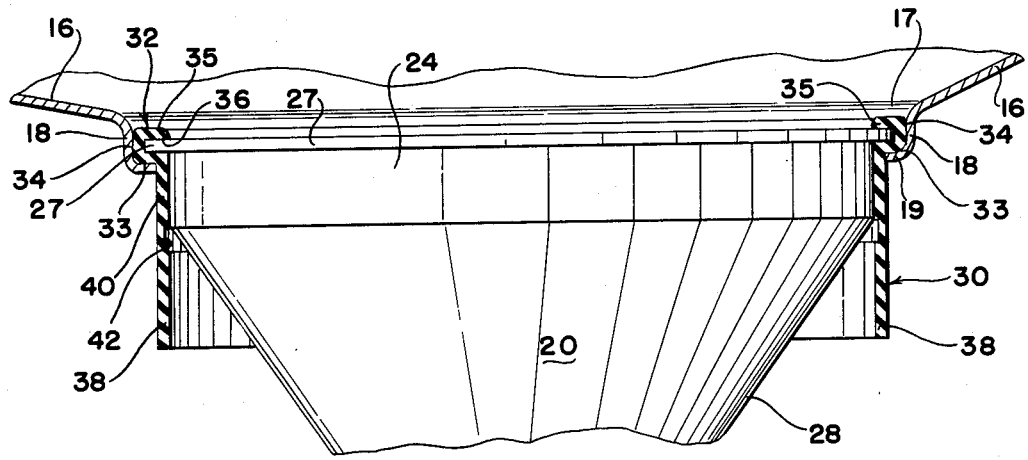
FIG. 4 is a cross-sectional view of the seal, in its unfolded condition, positioned between the sump and bottom wall of the dishwashing machine.

When the sump is properly mounted within seal 30 then both are inserted, sump outlet end 29 first, through the dish chamber side of outlet 17 and positioned within the space defined by annular side wall 18 in such a manner that rim shoulder 33 rests on inwardly projecting flange 19 and rim side wall 34 fits snugly between side wall 18 and the peripheral edge of sump flange 27 so as to provide a fluid seal therebetween as shown in FIG. 4. As may be appreciated, it is relatively easy to insure a good sealing relationship between the flange 27 and the rim 32, however, anything short of a compressive fit of seal 30 within the wall 18 will normally not insure that a seal is made at this location. This is because it occasionally happens that the surface which defines outlet 17 is irregular in one or more respects either because of manufacturing defects or other accidental deformation and the seal between this irregular surface and the seal rim 32 may be adversely affected to such an extent that a leak occurs.

Thus in accordance with the invention, a safety feature of the present seal insures that no leaks occur even though there is no compressive fit with the sidewall 18. With the parts positioned in the above described manner, the unrimmed end 38 of the seal is folded along grooved portion 42 outwardly and upwardly toward seal rim 32 until end portion 38 rests in engagement with and around the outer surface of annular side wall 18 as shown in FIG. 1 of the drawings. Seal 30 may then be secured in this folded and sealed position by means of a conventional strap 44 which is fitted about the periphery of unrimmed end 38 and tightened thereon by adjusting means 46. Thus any leakage between the seal rim 32 and sidewall 18 is trapped within an annular chamber which is formed between the now folded ends 38 and 40. Furthermore, since end 38 is compressed against the outer surface of annular sidewall 18 by strap 44, further leakage beyond the annular chamber is prevented.

When seal 30 is mounted in the manner described above and shown in FIG. 1, a first sealing surface is provided between sump 20 and seal 30 which includes the contact between: the external surface of sump wall 24 and the inner surface of rimmed end 40; and sump flange 27 and the entire inner surface of recess 36. In addition a second sealing surface is preferably provided between the inner surfaces of outlet 17, which include annular side wall 18 and flange 19, and the external surfaces of rim 32 which include rim shoulder 33, rim side wall 34 and a portion of the external surface of rimmed end portion 40. However in the event of a poor seal at this location, a good seal is nevertheless effected between the external surface of annular side wall 18 and the external surface of unrimmed end 38 which in its folded over condition is tightly pressed against side wall 18 by means of strap 44 thus to compensate for any irregularities in the external surface of sidewall 18. If any leaks occur, they are caught and held in the annular chamber.

A further significant feature of the invention which arises as a result of the complete and rather extensive surface to surface sealing contact between seal 30 and the outlet 17 and sump 20 on either side, is the prevention of the transmission of vibration from the motor and sump assembly to the bottom wall of the dishwasher.

While the form of embodiment of the invention as herein disclosed, constitutes a preferred form, it is understood that other forms may be adapted in accordance with the particular application without departing from the spirit of the invention as defined by the following claims.

I claim:
1. In a dishwasher, a coupling comprising
a first tubular member provided with a circular opening,
an axially extending peripheral flange at said opening having a radial portion thereon,
a second tubular member positioned circumjacent the first tubular member having a radial flange extending above the radial portion of said peripheral flange,
a seal between said first and second tubular members comprising
an elastormeric sleeve having an annular rim portion at one end with a groove therein sealably engaging the radial flange of the second tubular member and being of sufficient radial thickness to fit snugly between the two flanges, said axially extending peripheral flange having a slightly irregular surface with respect to said circular opening facing the radial flange of said second tubular member,
the sleeve being folded upon itself so that the other end is positioned adjacent the opposite surface of said peripheral flange thereby forming an annular chamber, and
circumferential clamping means adjacent said other end for radially compressing it against the opposite surface of said peripheral flange whereby any fluids escaping between said peripheral flange and said rim portion are retained in said annular chamber.

2. In a dishwasher, a coupling comprising
a first tubular member having a bottom wall provided with a circular opening,
an axially extending peripheral flange at said opening having an inwardly turned radial portion thereon,
a second tubular member positioned inside the first tubular member having a radial flange extending outwardly above the radial portion of said peripheral flange, the inner surface of said peripheral flange having a slightly irregular contour with respect to said circular opening,
an elastomeric sleeve member having an enlarged annular rim portion at one end with a groove therein sealably engaging the radial flange of the second tubular member and being of sufficient radial thickness to fit snugly between the two flanges, the sleeve being folded upon itself so that the other end is positioned radially outwardly of said peripheral flange thereby forming an annular chamber, and
a clamping ring surrounding said other end for compressing it against the outer surface of said peripheral flange whereby any fluids excaping between said peripheral flange and said enlarged rim portion are retained in said annular chamber.

3. In a dishwasher as set forth in claim 2 wherein a relatively shallow groove having a substantial width is formed on the inner surface of said elastomeric sleeve intermediate the ends thereof.

References Cited by the Examiner

UNITED STATES PATENTS

| | | | |
|---|---|---|---|
| 1,558,503 | 10/1925 | Pressler | 285—236 |
| 2,170,574 | 8/1939 | Sauzedde | 277—178 X |
| 2,771,754 | 11/1956 | Winkler | 277—178 X |
| 2,883,843 | 4/1959 | Bochan | 134—186 X |
| 2,886,829 | 5/1959 | Kadish | 277—178 X |
| 2,965,319 | 12/1960 | Hyde | 241—100.5 |
| 2,993,629 | 7/1961 | Ruhnke | 277—178 X |
| 3,043,338 | 7/1962 | Hanson | 277—178 X |
| 3,103,938 | 9/1963 | James | 134—186 X |

FOREIGN PATENTS 564,855  11/1932  Germany.

CARL W. TOMLIN, *Primary Examiner.*